United States Patent

Cadeddu

[11] Patent Number: 5,079,991
[45] Date of Patent: Jan. 14, 1992

[54] BRAKE BOOSTER

[75] Inventor: Leonardo Cadeddu, Crema, Italy

[73] Assignee: Bendix Italia S.p.A., Crema, Italy

[21] Appl. No.: 667,940

[22] Filed: Mar. 12, 1991

[30] Foreign Application Priority Data

Mar. 15, 1990 [IT] Italy .................. 67186 A/90

[51] Int. Cl.$^5$ ............................................. F15B 9/10
[52] U.S. Cl. ................................ 91/376.00 R; 91/374; 91/369.1
[58] Field of Search ................. 91/376 R, 374, 369.1, 91/369.2, 369.3, 369.4

[56] References Cited

U.S. PATENT DOCUMENTS

| 1,844,631 | 2/1932 | Bragg et al. | 91/376 |
| 3,831,489 | 8/1974 | Woo | 91/369.3 X |
| 4,283,911 | 8/1981 | Nakamura et al. | 91/369.2 X |
| 4,765,226 | 8/1988 | Bequet et al. | 91/376 R X |
| 4,907,494 | 3/1990 | Gantier et al. | 91/369.3 |
| 4,934,249 | 6/1990 | Ganter et al. | 91/376 R X |
| 4,970,939 | 11/1990 | Fecher et al. | 91/369.1 |
| 4,984,506 | 1/1991 | Perez | 91/376 R X |
| 5,005,465 | 4/1991 | Boehm et al. | 91/369.1 |

FOREIGN PATENT DOCUMENTS

| 0140187 | 5/1985 | European Pat. Off. | 91/376 R |
| 0482918 | 9/1929 | Fed. Rep. of Germany | 91/376 |

Primary Examiner—Edward K. Look
Assistant Examiner—Todd Mattingly
Attorney, Agent, or Firm—Larry J. Palguta; Ken C. Decker

[57] ABSTRACT

The brake booster comprises a housing (10) in which is displaced a driving piston (12) having a hub (14) and separates a front chamber (16) from a rear chamber (18), the front chamber (16) is connected to a source of fluid under a first pressure, the rear chamber (18) is capable of being connected to a source of fluid under a second pressure, and the driving piston (14) is capable of being displaced from a rest position in response to the establishment of a difference between the first and second pressures between the two chambers (16, 18) and the pressure difference is controlled by a valve mechanism (20) associated with input control members (34, 62, 60). The connection (62) between the rear chamber (18) and the source of fluid under the second pressure is made by the input control members (34, 62, 60).

8 Claims, 1 Drawing Sheet

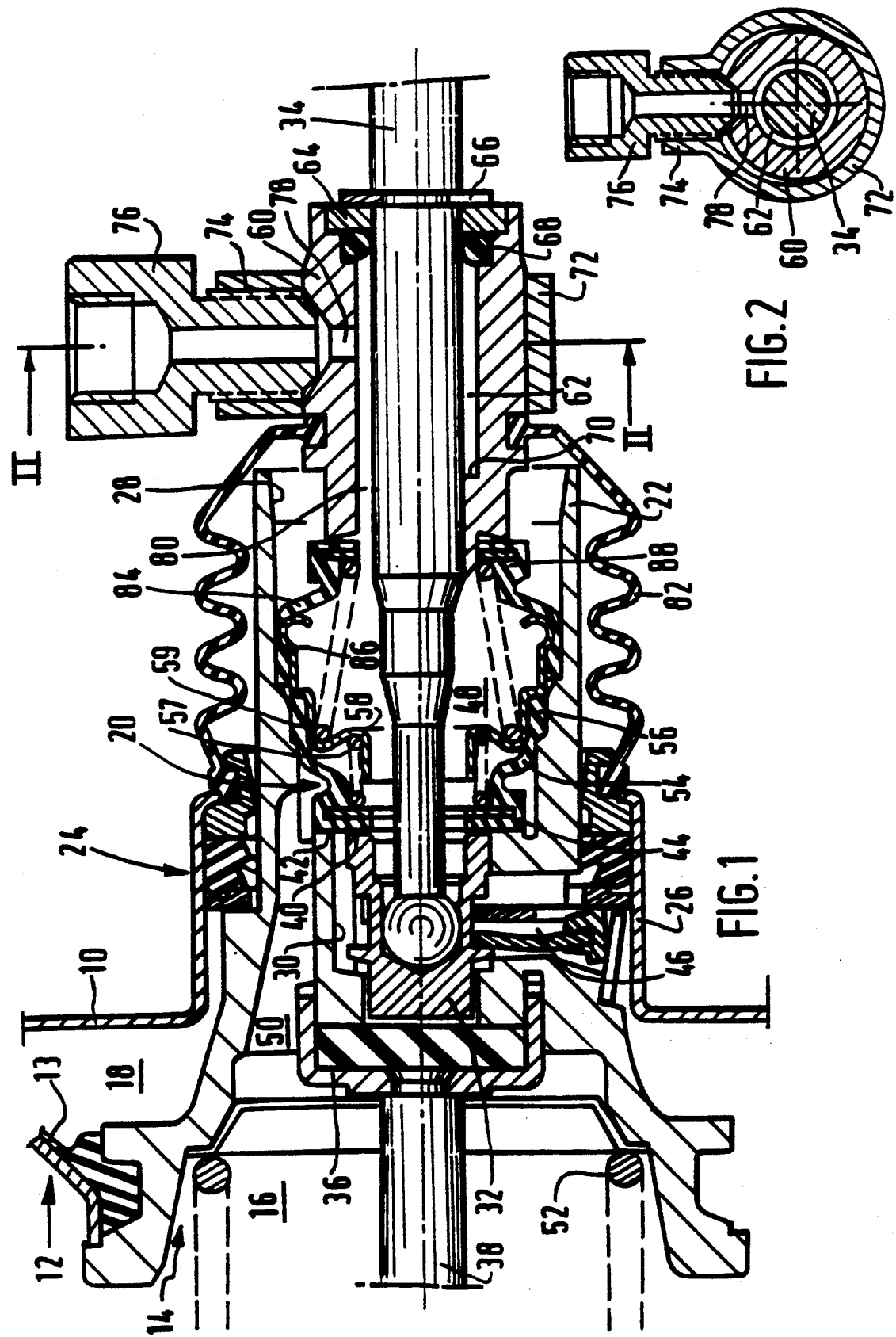

BRAKE BOOSTER

BACKGROUND OF THE INVENTION

The subject of the present invention is a brake booster, more particularly of the type comprising a housing in which is displaced a driving piston having a hub and separating a front chamber from a rear chamber, the front chamber being connected to a source of fluid under a first pressure, the rear chamber being capable of being connected to a source of fluid under a second pressure, and the driving piston being capable of being displaced from a rest position in response to the establishment of a difference between the first and second pressures between the two chambers, the pressure difference being controlled by valve means associated with input control members.

Such boosters are well known in the art of braking and function perfectly. The most frequent instance of use is encountered when the front chamber is connected to a vacuum source and the rear chamber is connected to a vacuum source and the rear chamber is capable of being connected to a source of air at atmospheric pressure during the actuation of the valve means.

However, there are instances where it is desirable, rather than using air at atmospheric pressure, to use air under a higher pressure, for example compressed air, in order to increase the boosting effect, reduce the overall size of the booster, etc.

Various solutions have been provided in this respect. Thus, U.S. Pat. No. 3,780,620 describes a booster in which the valve means comprise a plunger which is located in the hub of the piston and which can occupy three positions. In the first, it allows communication between the front chamber and the rear chamber by opening a passage in the valve means. In the second, the plunger shuts off this passage and allows air at atmospheric pressure to penetrate into the rear chamber via the valve means and thus generate a pressure difference on the driving piston, thereby providing the desired boost. In the third, the plunger engages second valve means in order to admit air under a pressure higher than atmospheric pressure into the rear chamber. Such an arrangement is very complicated and therefore very expensive and unreliable.

Again, U.S. Pat. No. 4,117,769 makes known a booster which possesses, inside the rear chamber, an auxiliary driving member comprising a pressure chamber capable of being connected to an external pressure source by means of a control device. When the control device is actuated, the auxiliary driving member thus exerts on the driving piston of the booster an auxiliary boosting force completely independent of the boosting force brought about by the actuation of the brake pedal. In the document U.S. Pat. No. 4,117,769, this auxiliary boosting force is utilized completely independently of the normal braking system of the vehicle in order to make it possible to add an assisted automatic braking system to this, without the need to resort to an additional booster. Such a system therefore requires an additional control device and a considerable modification of the booster in order to include the auxiliary driving member in it.

SUMMARY OF THE INVENTION

An object of the present invention is, therefore, to provide a brake booster, the efficiency of which is improved in a simple and reliable way, with only minor modifications being made to existing boosters.

According to the invention, this result is obtained by means of a booster of the type recalled above, in which the connection between the rear chamber and the source of fluid under the second pressure is made by the input control members. According to an advantageous embodiment, this connection is made by a passage provided in the input control members.

In a preferred embodiment, the valve means comprise an annular shutter element having an active part capable of interacting selectively with a first and a second shutter seat concentric and formed respectively in the hub and by a valve plunger sliding in the hub, the shutter element being mounted in the hub by means of a retention piece arranged in the hub and forming a first bearing for a return spring of the input rod and a second bearing for a valve spring stressing the active part of the shutter element toward the first and second seats, and according to the invention an annular diaphragm is mounted in the hub between the hub and the input control members.

Likewise advantageously, this annular diaphragm defines with the annular shutter element an annular chamber into which opens the passage provided in the input control members.

BRIEF DESCRIPTION OF THE DRAWINGS

The invention will now be described by way of example with reference to the accompanying drawings in which:

FIG. 1 shows in section the rear central part of a booster produced according to the present invention;

FIG. 2 is a sectional view on a reduced scale along the line II—II of FIG. 1.

DETAILED DESCRIPTION OF THE INVENTION

By convention, the direction in which the various components are displaced when they are actuated is called the "front" and the direction in which these components are displaced when they return to their rest position the "rear". Thus, in FIG. 1, the front is located on the left of the Figure and the rear on the right.

FIG. 1 shows the central rear part of a brake booster comprising, in a housing 10, a piston 12 consisting of a movable wall structure with diaphragm 13 and of a hub, designated as a whole by the reference 14, dividing the interior of the housing into a front chamber 16 intended to be connected permanently to a source of fluid under a first pressure, conventionally a vacuum source of a motor vehicle, for example the intake manifold of the engine of this vehicle (not shown), and a rear chamber 18 or working chamber capable of being put in communication either with the front chamber 16 or with a source of fluid under a second pressure, conventionally the atmosphere, by way of a valve means comprising an annular shutter element and designated as a whole by the reference 20.

The piston assembly 12 comprises a rear tubular hub part 22 mounted sealingly and slidably, with an assembly 24 consisting of a guide ring and of a sliding gasket being interposed, in a rear central chimney 26 of the rear wall 10 of the housing.

The tubular hub part 22 is formed with an inner stepped receptacle 28 connected toward the front to a central bore 30, in which is mounted slidably a valve plunger 32 coupled to a booster input rod 34 intended to be connected to a brake pedal (not shown) of the vehicle and axially extending centrally in the stepped receptacle 28.

The hub 14 also supports, with a reaction disc 36, with which the valve plunger 32 is capable of interacting by compressive engagement, being interposed, a booster output rod 38 intended to be coupled to a piston of a master cylinder (not shown) and associated with the booster.

The rear end of the valve plunger 32 forms a central annular shutter seat 40, the connection zone between the stepped receptacle 28 and the bore 30 forming another annular shutter seat 42 surrounding the preceding one and concentric relative to this. The shutter element 20 comprises an active front annular part 44 of general radial extension, typically reinforced by an annular metal plate intended for interacting selectively with the shutter seats 40 and 42, so as to control the putting of the rear working chamber 18 in communication, via a passage 46 formed radially in the hub 14 and communicating with the bore 30, with the space 48 located behind the shutter element 20 or with the front chamber 16 via air passages 50 formed axially in the hub 14 and opening into the front end of the stepped receptacle 28 round the shutter seat 42 and the active part 44 of the shutter element 20. In the rest position, the piston assembly 12 is positioned in the vicinity of the rear wall 10 under the effect of a piston return spring 52.

The radially outer end of the active part 44 of the shutter elements 20 is extended rearward by an axial corrugated tubular part 54 produced integrally with the elastomeric material of the active part 44 and terminating at the rear in a mounting bead 56 bearing on a shoulder extending radially toward the inside of the stepped receptacle 28 and compressed radially against the wall of this receptacle by a shutter retention cup 58. This cup 58 has, in radial section, the form of an "S", the inner rounding of which serves as a bearing for a shutter spring 57 stressing the active part 44 of the shutter element 20 axially in the direction of the shutter seats 40 and 42 and the outer rounding of which forms a bearing for a return spring 59 of the rod 34.

According to the present invention, the efficiency of the booster can be increased by putting the space 48 located behind the shutter element 20 not under atmospheric pressure, as is known, but under a higher pressure. In the example illustrated, this result is obtained by arranging on the rear end of the input rod 34 a sleeve 60 of a diameter slightly larger than that of the input rod, so as to provide an annular volume 62 around it. The sleeve 60 is retained on the input rod 34 at the rear by a centering ring 64 and a stop ring 66, a gasket 68 ensuring the sealing between the volume 62 and the outside atmosphere, and at the front by a sleeve shoulder 70 directed radially inward and of a diameter equal to that of the input rod 34.

Arranged on the sleeve 60 is a connection piece 72 surrounding the sleeve 60 and equipped with a cylindrical extension 74 which is directed radially outward and the interior of which is internally threaded for receiving a connector 76 for connection to a fluid source (not shown). A duct 78 is made in the sleeve 60 in line with the cylindrical extension 74, to put the volume 62 in communication with the interior of the connector 76, and a groove 80 is made in the shoulder 70 to put the volume 62 in communication with the space 48.

It is thus now necessary only to ensure the sealing of the volumes 48 and 62 relative to the atmosphere, and this can be carried out in various ways. The sleeve 60 can be made to slide sealingly in the receptacle 28. It is also possible to provide a concertina 82 fastened sealingly to the rear part of the chimney 26 on the one hand and to the sleeve 60 on the other hand.

In the preferred embodiment illustrated by way of example, there is an annular diaphragm 84 retained sealingly on the one hand against the wall of the receptacle 28 by means of a retaining ring 86 and on the other hand on the sleeve 60. Advantageously, to make it easier to assemble the unit as a whole, as in the example illustrated, this diaphragm can be held laid against the front end of the sleeve 60 by the rod return spring 59 itself by means of a radially extending annular part 88 shaped in a similar way to the active part 44 of the shutter element 20.

As alternative versions, the diaphragm 84 and the shutter element 20 can be identical or they can be produced integrally with one another. Also, the shutter retention cup 58 and the retaining ring 86 can be produced integrally with one another.

As just described, the mechanical functioning of the booster is identical to that of a conventional booster when the front chamber 16 is subjected to a vacuum and fluid at atmospheric pressure is admitted via the connector 76.

By means of the invention, other types of functioning can be considered, since any pressure existing between the front chamber 16 and rear chamber 18 can be obtained and no longer only that existing between the vacuum prevailing in the engine intake manifold and atmospheric pressure.

Thus, when the front chamber 16 is subjected to a vacuum and the connector 76 is connected to a source of fluid under a pressure higher than atmospheric pressure, the boosting effect will be the greater, the higher the pressure supplied by this source. Consequently, for a desired efficiency, it is possible to design a less bulky booster, and conversely a booster of a given size can afford a higher efficiency.

Another advantage of this mode of functioning where the booster is connected to a vacuum source on the one hand and to a pressure source on the other hand is that, in the event of a failure of one of the two sources, a partial boost is preserved.

Likewise, for example to solve pollution problems, if it is undesirable to connect the front chamber 16 to the intake manifold, the invention makes it possible to connect it to the atmospheric pressure, the boost being provided by the fluid under pressure present in the volume 48.

By means of the invention, a booster whose efficiency is improved by any desired factor has thus been provided. Tests conducted by the Applicant showed that this factor could be between 37.5% and 500%, depending on the pressure of the fluid arriving via the connector 76.

The source of fluid under pressure can consist of a compressor driven by the vehicle engine or of an electrical compressor. A considerable advantage of the booster according to the invention is that, when it is used on a vehicle already having a source of fluid under pressure, for example vehicles with pneumatic suspension, it does not need its own source of fluid under pressure and it can therefore be installed at very low cost.

Moreover, all these advantages are afforded as a result of a simple modification of the system, at the same time implying a functioning reliability and a low implementation cost.

Of course, the invention is not limited to the embodiment just described by way of example, but embraces all its alternative versions which an average person skilled in the art can give it. For example, the supply of fluid under the second pressure into the space located behind the shutter hub can be carried out by means of a duct made directly in the input rod, opening into this space and putting it in communication with the fluid source. Furthermore, the invention is used both in single boosters and in double boosters, also called tandem boosters. Finally, the fluid under the second pressure can be supplied permanently or be supplied only at the moment when the driver actuates the brake pedal or only when a particular pressure prevails in the brake circuit.

What we claim is:

1. A brake booster, comprising a housing in which is displaced a driving piston having a hub and separating a front chamber from a rear chamber, the front chamber being connected to a source of fluid under a first pressure, the rear chamber being capable of being connected to a source of fluid under a second pressure, the driving piston being capable of being displaced from a rest position in response to the establishment of a pressure difference between the first and second pressures of the chambers, the pressure difference being controlled by valve means associated with input control members, the valve means comprising an annular shutter element having an active part capable of interacting selectively with first and second concentric shutter seats and formed respectively in the hub and by a valve plunger sliding in the hub, the shutter element being mounted in the hub by means of a retention cup arranged in the hub and forming a first bearing for a return spring of an input rod and a second bearing for a valve spring stressing an active part of the shutter element toward the first and second seats, wherein an annular diaphragm is mounted in the hub between the hub and the input control members.

2. The booster according to claim 1, wherein the annular diaphragm is mounted on the hub by means of the retention cup.

3. The booster according to claim 2, wherein the annular diaphragm is held against the input control members by the return spring of the input rod.

4. The booster according to claim 1, wherein the annular diaphragm defines with the annular shutter element an annular chamber into which opens a passage provided in the input control members.

5. The booster according to claim 4, wherein the first pressure is one of lower than and equal to atmospheric pressure.

6. The booster according to claim 4, wherein the second pressure is one of higher than and equal to atmospheric pressure.

7. The booster according to claim 1, wherein the connection between the rear chamber and the source of fluid under the second pressure is made by a passage provided in the input control members.

8. The booster according to claim 7, wherein the input control members consist of the input rod around which a sleeve is fastened, the passage being provided between the input rod and the sleeve.

* * * * *